United States Patent
Sharples

[19]

[11] Patent Number: 5,935,713
[45] Date of Patent: Aug. 10, 1999

[54] PROTECTIVE RESISTANT COMPOSITE MATERIAL AND PROJECTILE RESISTANT COMPOSITE BODY FORMED THEREFROM

[75] Inventor: William Sharples, Stockport, United Kingdom

[73] Assignee: Hyperlast Limited, Stockport, United Kingdom

[21] Appl. No.: 08/793,574

[22] PCT Filed: Aug. 22, 1995

[86] PCT No.: PCT/GB95/01991

§ 371 Date: Jul. 14, 1997

§ 102(e) Date: Jul. 14, 1997

[87] PCT Pub. No.: WO96/06724

PCT Pub. Date: Mar. 7, 1996

[30] Foreign Application Priority Data

Aug. 27, 1994 [GB] United Kingdom .................... 9417316

[51] Int. Cl.⁶ .............................. B32B 27/40; C08L 75/04
[52] U.S. Cl. ....................... 428/423.1; 428/911; 523/142; 524/590; 524/871
[58] Field of Search .................................... 428/63, 423.1, 428/454, 911; 524/590, 871; 523/142

[56] References Cited

U.S. PATENT DOCUMENTS 4,960,620   10/1990   House et al. ........................ 427/385.5

FOREIGN PATENT DOCUMENTS

A 0 348 556   1/1990   European Pat. Off. .
A 2 170 776   9/1973   France .
A 2 459 351   of 1981  France .
C 32 41 526   12/1983  Germany .

OTHER PUBLICATIONS

Derwent Abstract JP 62 197589 A (1987).

*Primary Examiner*—Mark L. Warzel
*Attorney, Agent, or Firm*—Salter & Michaelson

[57] ABSTRACT

A composite material resistant to armour piercing bullets consisting of a highly elastic polyurethane matrix into which is embedded aggregate, preferably in the form of rounded pebbles having an average screened size range of from about 20 mm to about 60 mm.

17 Claims, 1 Drawing Sheet

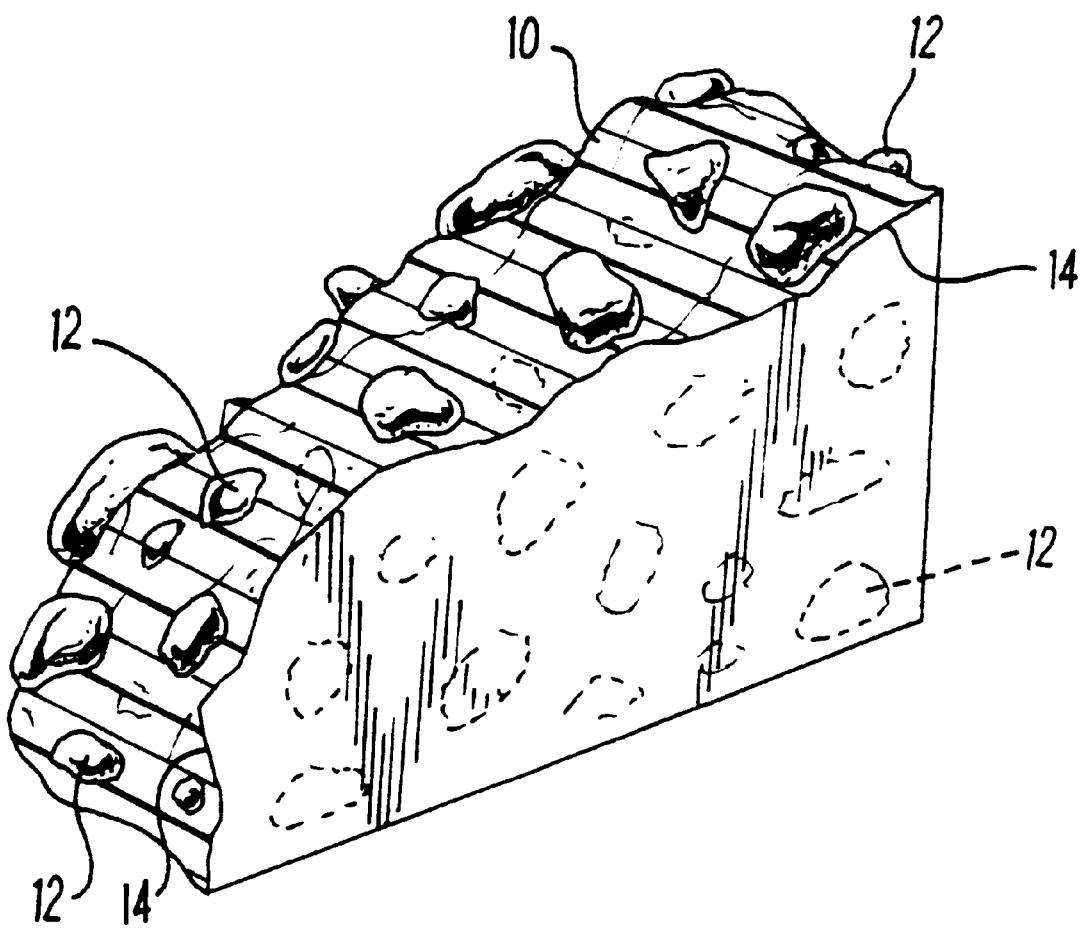

PROTECTIVE RESISTANT COMPOSITE MATERIAL AND PROJECTILE RESISTANT COMPOSITE BODY FORMED THEREFROM

This invention relates to a composite material and more particularly a composite material for use in buildings for protection against projectiles such as armour piercing bullets and the like.

There have been many proposals for protection against bullets and in particular armour piercing bullets. The conventional material for this purpose is steel, but this is expensive and not usually used in buildings. The weight of steel is such that a building in which it is used will normally need to be specially strengthened to support the load thus making the use of steel very expensive. The other conventional material is concrete. At least 14 inches of concrete is needed to stop an armour piercing bullet so that again a building would need to be specially strengthened to support the weight of material needed for effective protection.

The present invention has been made in order to deal with this problem.

According to the invention there is provided a composite material comprising an elastic resin matrix and stone aggregate distributed in the matrix.

In a preferred embodiment of the invention the aggregate is in the form of stone pebbles having an average screened size range of from about 20 mm to about 60 mm. The shape of the pebbles is not important, but rounded pebbles of the kind that occur in river beds are particularly preferred. The disposition of the pebbles in the resin matrix is preferably such that the majority of pebbles are in contact with adjacent pebbles and distributed substantially throughout the resin matrix.

The elastic resin is preferably a polyurethane resin, more preferably a polyester polyurethane, having a high elasticity i.e. elongation at breakpoint, for example an elasticity in the range 100% to 700% and more preferably between 500% and 600%.

The composite material of the invention is preferably formed by placing the stone aggregate in a mould and pouring a mixture of isocyanate prepolymer and polyol into the mould and allowing the polyurethane to cure. It is preferred that the polyurethane mix be added to the mould so as to cover the stones for example by a few millimeters so as to form a layer of polyurethane only on at least one side of the moulded product. This layer can form a so-called "spalling", or anti-spalling, layer in the product which is often desirable when constructing protection against bullets.

It is important that water should not be present during the formation of the product of the invention. To that end the stone aggregate is preferably dried by heating at a temperature up to about 80° C. and then cooling to 40–45° C. with appropriate ventilation. The mould also should be moisture free and may advantageously be coated with a release agent such as a wax. The mould itself may be made of any suitable material such as wood or metal.

Reference is now made to the accompanying drawing which shows by way of example a piece of composite material, partly in section. The composite material as shown comprises an elastic resin matrix 10 into which are embedded a plurality of pebbles 12. The pebbles have a generally rounded shape and are distributed throughout the resin matrix except at the sides of the product where the resin material forms a thin spalling layer 14.

Products of the invention have been found to be highly resistant to armour piercing bullets ranging from 7.62 mm to ½ inch. The size of the stone aggregate is desirably chosen having regard to the calibre of bullet that the material of the invention is to resist. For example smaller size stones, of the order of 20 mm average diameter are used with smaller calibre bullets such as 7.62 mm and larger size stone, of the order of 40 mm average diameter with larger bullets. The relative proportions of resin and stone in the composite material will vary to some extent depending on the size of the stones. Generally the preferred amount of resin is from 10 to 50% based on the total weight, with a particularly preferred proportion being about 25%.

If desired additives can be included in the composite material. For example a fire retardant can be included which will help to prevent fire damage being caused by incendiary missiles. Pigments can also be included to obtain a desired aesthetic and/or camouflage effect.

The material of the invention can be cast in any desired shape depending on the end use required.

The following examples further illustrate the invention.

EXAMPLE I

A mould of 1 square meter internal dimension was constructed of MDF board, 1 inch thick. The sides and base were held together by screws or coach bolts. The internal surface of the mould was treated with Macwax and allowed to dry for 5 minutes.

Approximately 115 kg of 25–30 mm screened stone pebbles were poured into the mould and evened out to a depth of about 72 mm. This allowed for a spalling layer of 3 mm. When level a mixture of 100 parts by weight isocyanate prepolymer (7855057) and 90 parts by weight polyol prepolymer (7851254) were dispensed from a mixing machine over the stone. Approximately 35 kg of polymer was added.

The dispensing nozzle was moved over the area to ensure even distribution. Entrapped air is released as the mould was filled to a 75 mm mark on the side. When filling was complete the mould was allowed to stand for 1 hour. During this period an exothermic reaction occurred which increased the temperature from 45 to 75–80° C.

After 1 hour the panel was released from the mould and transferred to an oven at 80° C. for a period of 16 hours.

The sample was allowed to cool at room temperature and was then ready for use. The elasticity of the resin was 550%.

A block of 75 mm thickness weighing 30 kg was tested in accordance with BS5051 and found to withstand 7.52 mm armour piercing bullets of Chinese origin. No spalling occurred.

The equivalent result using concrete would require a block of 175 mm thickness weighing 82 kg or steel of 23 mm thickness weighing 36 kg.

EXAMPLE II

The same procedure was follows as in Example I except as follows:

230 kg of 40–50 mm screened stone pebbles were placed in the mould and the mould filed with the polymer mix to a level of 150 mm. About 70 kg of polymer was added.

A test piece of 150 mm thickness weighing 60 kg withstood an 0.5 inch armour piercing incendiary bullet.

To produce an equivalent result with reinforced concrete would require a block with a thickness of 325 mm weighing 151 kg and with steel a thickness of 41 mm weighing 65 kg.

The invention is not restricted to the above described embodiments and many variations and modifications can be made. For example it is not essential to use natural stone aggregate; ceramic or the like material can also be used.

I claim:

1. A composite material for use in making a projectile resistant body, the material comprising an elastic polyurethane matrix having an elongation at break-point of at least 550%;

one portion of said matrix including a stone aggregate comprising rounded pebbles in a size range above 20 mm in diameter embedded in said matrix; and another portion of said matrix including an aggregate-free anti-spalling layer.

2. A composite material as claimed in claim 1, wherein the aggregate comprises stone pebbles having an average screened size range of from about 20 mm to about 60 mm.

3. A composite material as claimed in claim 2 wherein the majority of the pebbles are in contact with one or more adjacent pebbles.

4. A composite material as claimed in claim 1, wherein said composite material includes an aggregate free layer of resin on at least a part of an exterior side thereof, said aggregate free layer of resin forming said anti-spalling layer on said exterior side of the composite material.

5. A projectile resistant body comprising a composite material, said material comprising an elastic polyurethane matrix having an elongation at break-point of at least 550%;

said body including a stone aggregate portion comprising rounded pebbles in a size range above 20 mm diameter embedded in said matrix, said body also including an aggregate-free anti-spalling layer on at least one exterior side of the body.

6. The composite body of claim 5 wherein said at least one exterior side surface has an excess thickness of resin provided thereon, said excess thickness of resin being substantially free from aggregate material and thus forming said anti-spalling layer on said at least one exterior side of said body.

7. The composite body of claim 5 wherein said aggregate comprises rounded stone pebbles having an average screened size range of between 20 mm and 60 mm.

8. The composite body of claim 5 wherein individual aggregate elements are substantially in contact with adjacent aggregate elements within said aggregate/resin matrix.

9. The composite body of claim 7 wherein said rounded stone pebbles are substantially in contact with adjacent pebbles within said aggregate/resin matrix.

10. The composite body of claim 3 wherein said body comprises a panel having opposing interior and exterior surfaces.

11. The composite body of claim 10 wherein said interior surface of said body has an excess thickness of resin provided thereon, said excess thickness of resin being substantially free from aggregate material, said excess thickness of resin forming said anti-spalling layer to prevent the fragmenting of said composite body and said aggregate material when a projectile enters the composite body through the exterior surface thereof.

12. The composite body of claim 10 wherein said aggregate comprises rounded stone pebbles having an average screened size range of between 20 mm and 60 mm.

13. The composite body of claim 11 wherein said aggregate comprises rounded stone pebbles having an average screened size range of between 20 mm and 60 mm.

14. The composite body of claim 10 wherein individual aggregate elements are substantially in contact with adjacent aggregate elements within said aggregate matrix.

15. The composite body of claim 13 wherein said rounded stone pebbles are substantially in contact with adjacent pebbles within said aggregate matrix.

16. A method of making a projectile resistant body, the method comprising the steps of:

placing a stone aggregate comprising rounded pebbles in a size range above 20 mm diameter into a mold;

pouring a polyurethane resin forming mixture into the mold to embed the stone aggregate in the resin, said resin being added to the mold in an amount to cover said aggregate and further form an aggregate-free layer to comprise an anti-spalling layer; and curing the resin to form a polyurethane resin matrix with an elongation at break-point of at least 550%.

17. The method of claim 16 wherein the aggregate material and the mold are dried before the aggregate is added to the mold.

* * * * *